June 17, 1969  J. J. EZOLT  3,450,282
SLIDABLE AND TILTABLE TRUCK BED
Filed March 7, 1967  Sheet 2 of 2

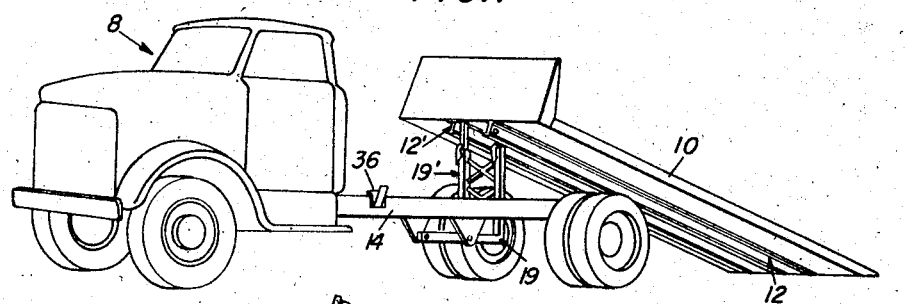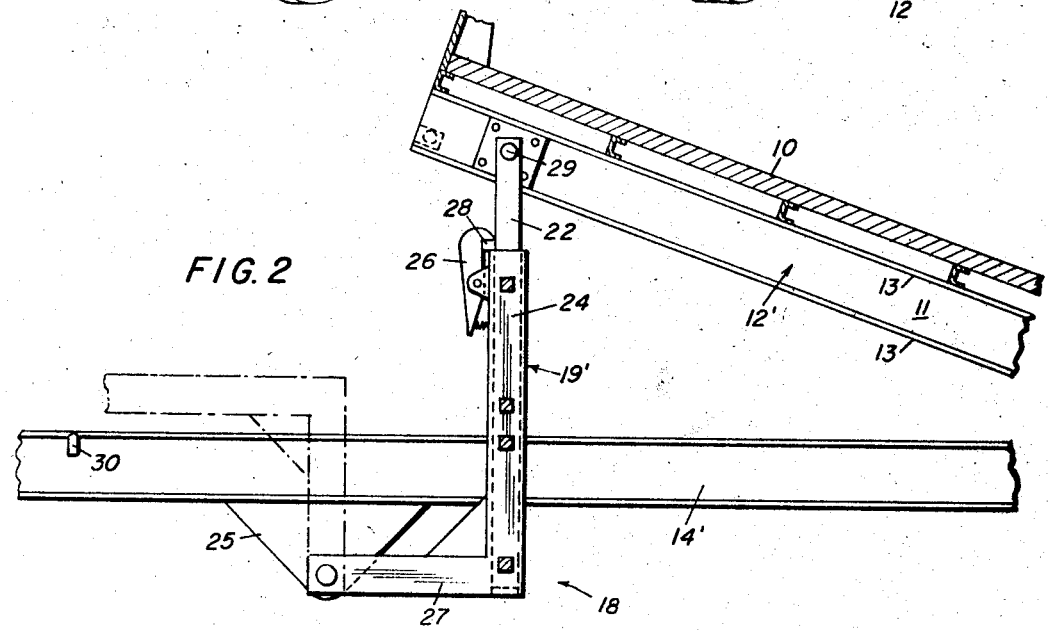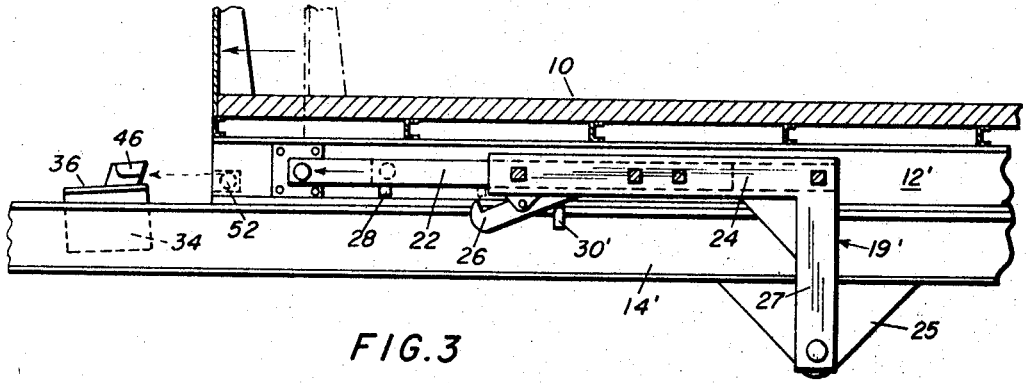

INVENTOR
JAMES J. EZOLT
BY Robillard and Bejrne
ATTORNEYS

United States Patent Office 3,450,282
Patented June 17, 1969

3,450,282
SLIDABLE AND TILTABLE TRUCK BED
James J. Ezolt, State Line, Pa., assignor, by mesne assignments, to Grove Manufacturing Company, Shady Grove, Pa., a corporation of Pennsylvania, a wholly-owned subsidiary of Walter Kidde & Company, Inc.
Filed Mar. 7, 1967, Ser. No. 621,216
Int. Cl. B60p *1/04;* B66c *23/00*
U.S. Cl. 214—505                         10 Claims

ABSTRACT OF THE DISCLOSURE

A tilting and slidable bed for a vehicle having an extendable lever pivotally connected between the chassis frame and the bed and having an automatic positive locking cam to secure these members together when said bed is in its horizontal forward travel position.

---

This invention relates generally to heavy-duty, load-carrying platforms or beds for use with vehicles and more specifically to such a bed which has its rearward end tiltable into engagement with the ground to form a ramp for the loading of material or for the boarding of vehicles.

It is an object of this invention to provide an improved tilting bed structure which overcomes the disadvantages of the prior art by furnishing a telescoping, connecting lever assembly which increases the available length of the tilted bed and decreases the loading angle thereof while maintaining the advantages of sturdy construction.

It is another object of this invention to provide a tilting bed vehicle of maximum efficieny and minimum complexity which incorporates an L-shaped pivoting lever structure, the lever structure telescoping between a loading position and a tilting position to provide a minimum loading angle for the tilted bed while providing the movement necessary to lockingly engage a hold-down apparatus.

Another objective of this invention is to provide a positive hold-down means to prevent vertical movement of the forward end of the platform by furnishing a cam-lock means on the platform which engages the bed as it slides horizontally to its forward transport position.

Another important objective of this invention is to provide a slidable, tiltable truck bed lock-down device wherein a cam follower on the bed engages a cam carried by the framework of the truck, causing a portion of the truck bed to be positively wedged beneath a lock-down plate carried by the framework.

These and other objects of the invention will become more apparent to those skilled in the art by reference to the following detailed description when viewed in light of the accompanying drawings, wherein:

FIGURE 1 is a perspective view of a truck having a tiltable, slidable truck bed;

FIGURE 2 is an enlarged sectional view of the forward portion of the truck bed and frame of FIGURE 1 in its tilted or loading position;

FIGURE 3 is a view similar to FIGURE 2 showing the truck bed and frame in an intermediate position between a travel position and a loading position;

Figure 4:
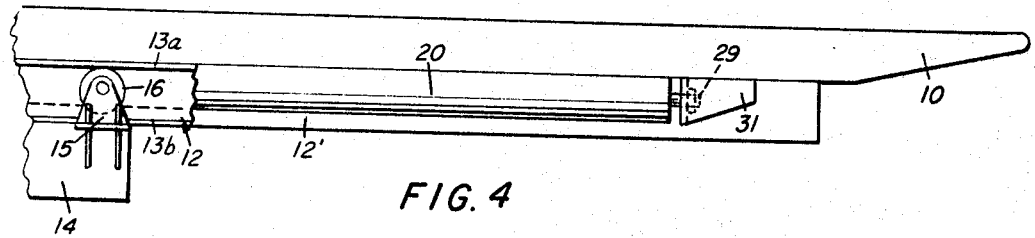
FIGURE 4 is an enlarged side elevation view of the rear portion of the truck bed and frame of FIGURE 1 in travel position.
Figure 5:
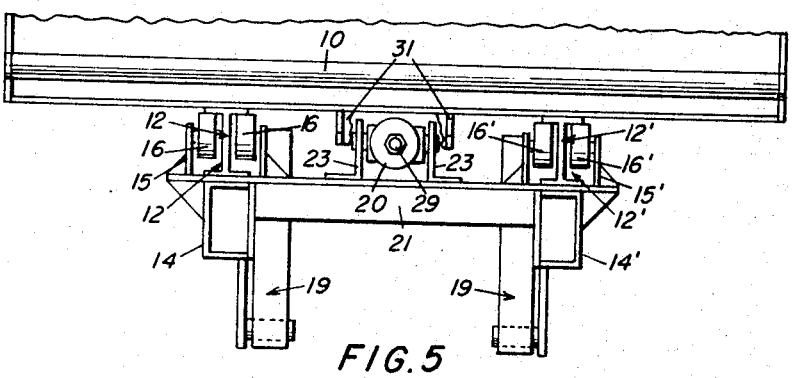
FIGURE 5 is a rear view taken from the right of FIGURE 4.

Referring now to the drawings wherein like elements are indicated by like numerals, the numeral 8 designates a truck or vehicle with which this invention may be used. The vehicle is equipped with horizontal chassis beams 14 and 14′ which extend from a point near the cab past the rear wheels thereof. A cross-beam 21 extends between beams 14 and 14′ at their rearmost end. A pair of double-roller support units 16 and 16′ (FIGURES 4 and 5) are respectively mounted by brackets 15 and 15′ at the rear of each of the chassis beams near beam 21. On occasion, as this description proceeds, reference will be made to certain elements by numeral and to corresponding elements of a pair on the other side of the truck with this same numeral plus a prime mark. Those skilled in the art will readily appreciate which elements are in pairs.

The load-carrying bed is indicated by the numeral 10. Affixed to the bed's lower surface are a pair of spaced I-beams 12 and 12′. The I-beams are conventional and include upper and lower flanges 13a and 13b connected by a vertical central web 11. The bed 10 is slidably and tiltably supported to the vehicle chassis beam by respectively threading the I-beams 12 and 12′ through the roller units 16 and 16′ such that the rollers engage the lower surfaces of the top flanges 13a and 13a′. This can be seen best in FIGURES 4 and 5. Therefore, the bed 10 can slide relative to beams 14 and 14′ over rollers 16 and 16′ and the bed also tilts about these rollers.

The forward end of the bed 10 is secured to the chassis by way of a pair of L-shaped cantilever arms 19 and 19′. The L-shaped arms are fully disclosed in the United States patent to Forsythe No. 3,159,294. However, as will be noted by reference to the Forsythe patent, the arms 28 thereof are not extendable and thus an intermediate framework 24 is required if positive hold-down is to be obtained in a practical manner.

Returning now to the drawings of this invention, it can be seen that the platform 10 is movable from its "loading" position shown in FIGURE 1 to a normal, horizontal "travel" position with the forward end thereof adjacent the cab. Travel between these positions is accomplished by action of a double-acting hydraulic motor 20. Intermediate its length the motor 20 is pivotally secured to the chassis by a cradle assembly 23 which extends upwardly from cross-beam 21. A piston rod 29 extends rearwardly from the motor and its outer end is pivotally secured to the bed at brackets 31. As the motor 20 is expanded the bed will move rearwardly. Further expansion of the motor will cause the cantilevers 19 to tilt the platform until it reaches the position of FIGURE 1.

When in this loading position, the levers 19 and 19′ are disposed as shown in FIGURE 2. Each lever includes a tubular portion 24 which telescopically receives an extension arm 22 which at its outer end is pivotally secured to the bed at brackets 29. The levers also include members 27 which are perpendicular to members 24 and are pivotally secured to the chassis at brackets 25 and 25′.

Latch elements 26 are pivotally mounted on the free end of each section 24 and each has a face normally biased to a position for engagement with a lug 28 welded to the extension arm 22. When so engaged, the extensions 22 and 22′ are maintained in their nested positions as shown in FIGURE 2.

Therefore, when bed 10 is in its tilted position the motor 20 is expanded and cantilevers 19 and 19′ are nested. As motor 20 contracts the bed is pulled forwardly and the cantilevers will rotate about their pivot connections in brackets 25. As the bed 10 and the legs 24 of the levers lower to the horizontal (dotted line of FIGURE 2), the latches 26 (FIGURE 3) are tripped by lugs 30 and 30′ which are welded to the upper surfaces of I-beams 14 and 14′. With the latches tripped, arms 22 are permitted to withdraw from leg 24 upon a further contraction of cylinder 20. Thus, the bed 10 moves horizontally toward the cab in the final stages of its movement to the "travel" position.

Figure 6:
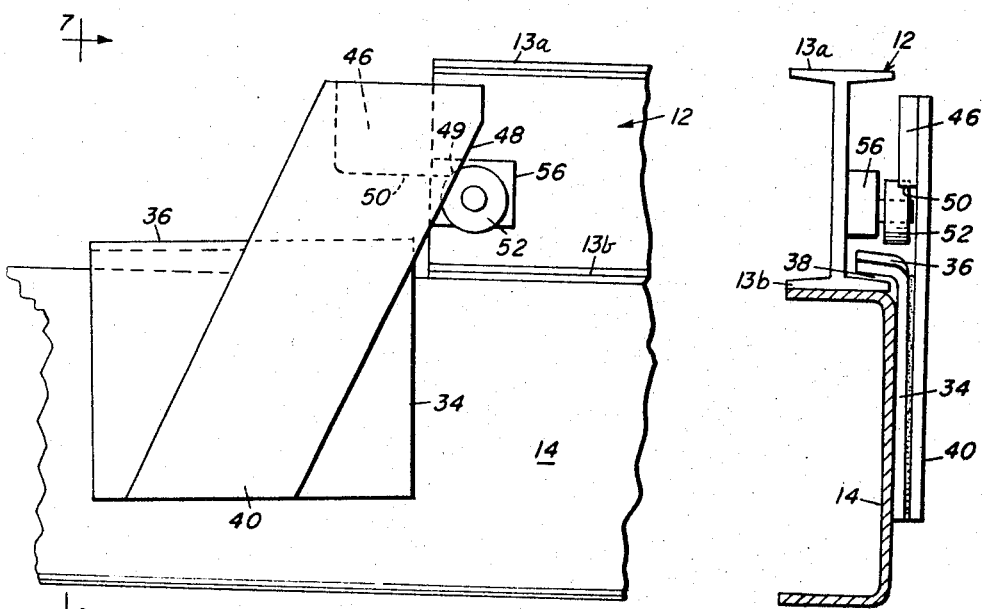
FIGURE 6 is an enlarged side elevation view of the front portion of FIGURE 3 showing a positive hold-down and cam apparatus.
Figure 7:
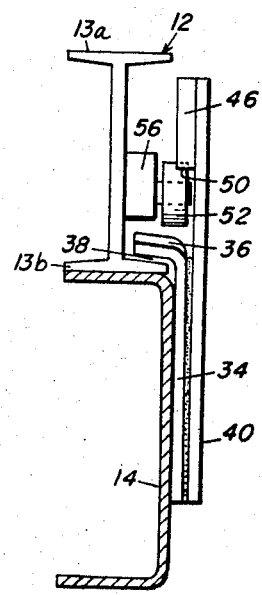
FIGURE 7 is a sectional view taken along lines 7—7 of FIGURE 6.

This invention provides means to positively prevent vertical movement of the bed 10 as it reaches this transport or travel condition. The lock-down assembly can best be understood with reference to FIGURES 6 and 7 where the various components are shown in enlarged detail. A pair of inverted L-shaped lock-down plates 34 are rigidly attached to the respective vertical outer surfaces of the channel beams 14 and 14' with their rearmost portions forward of the point where the forward ends of beams 12 and 12' come to rest on the chassis beams 14 and 14'. The upper edge 36 of the lock-down plate 34 is turned inwardly over and defines a slot 38 with channel 14 for receiving the lower flange 13b of the beams 12. As seen in FIGURE 6, the guide slot 38 decreases from its aft end to its forward end due to the angular bend of edge 36. Thus, member 36 and the underlying portion of the chassis frame 14, constitute a wedge locking throat for the outer edge of flange 13b.

A cam support 40 of parallelogram shape is rigidly secured to the lock-down plate 34. The cam support extends above the lock-down plate 34 and carries a cam 46 at its upper, inner surface. The cam is formed with a front camming surface 48, a circular surface 49 and a lower surface 50 on the lower face thereof. The cam surface 48 is inclined upwardly and rearwardly with respect to the channel beam 14 while the arcuate surface 49 provides a smooth transistion therefrom to the lower substantially horizontal cam surface 50.

A cam follower 52, positioned to cooperate with the cam 46, is spaced from the outer surface web 11 of the bed frame I beam 12 and secured adjacent the forward end thereof. The cam follower 52 is preferably in the form of a roller rotatably mounted on a mounting block 56 which is affixed to the beam 12. The relative disposition of the cam 46, cam follower 52, and lock-down plate 34 are such that, when the truck bed 10 and frame 12 are in the final stage of return movement to the transport position, the cam follower 52 will engage the cam 46 successively along the cam surfaces 48, 49 and 50 and guide the lower flange 13b into the wedge locking throat 38.

In operation, during the initial actuation of the motor 20, the bed 10 is drawn rearwardly as it moves from the transport to the loading position. As the bed moves, the cam follower 52 and the flange 13 are withdrawn from the cam surfaces 48, 49 and 50 and the hold-down plate 34 respectively thereby freeing the forward end of the bed 10 for vertical movement during the remaining portion of the cycle as was described above. Upon return of the bed 10 from the tilted position under the influence of the motor 20, the I beam 12 slides along the upper surface of beam 14 until the cam follower 52 engages the sloped camming surface 48. At this point the I beam 12 is forced downwardly into positive engagement with the upper surface of beam 14 due to the interaction between the camming surface 48 and the cam follower 52 and retained in such engagement as the cam follower moves around the arcuate surface 49 and along the surface 50. During the camming movement, the lower flange 13 of the beam 12 enters the slot 38 which, due to its decreasing width, wedges the lower flange 13 as it moves forwardly to thereby block vertical movement of the bed 10 and its operating mechanism relative to the truck chassis frame when the bed is in its transport condition. A positive hold-down is thereby provided to prevent vertical movement of the bed 10 and its operating mechanism relative to the truck chassis frame.

What is new and therefore desired to be protected by Letters Patent of the United States is:

1. A tilting bed vehicle comprising:
a wheeled chassis frame;
a bed frame disposed on said chassis frame and movable between a first position of substantially coextensive and parallel adjacent relationship thereto and a second position rearwardly translated relative thereto;
means to move said bed frame between said first and second positions;
an extendable angulated supporting lever means connecting said frames having one end pivotally attached to the chassis frame and the other end pivotally attached to the bed frame, said lever means being extended when said bed frame is disposed in said first position and retracted and pivoted upwardly to supportingly raise one end of said bed frame when said bed frame is moved toward said second position.

2. A vehicle in accordance with claim 1 wherein said lever means comprises: a tubular lower section pivotally connected to said bed frame.

3. A vehicle in accordance with claim 2 wherein lock means are provided to retain said lever means in a retracted configuration in the upwardly pivoted condition thereof, release means to deactivate said lock means and release said lever means for extension when said bed frame is parallel to said chassis frame.

4. A vehicle in accordance with claim 3 wherein said lock means comprises a transversely extending ear on each of said upper sections, a latch pivotally mounted on each of said lower sections and disposed to engage said ear when said lever is in a fully retracted configuration, and means to bias said latch into engagement with said ear.

5. A vehicle in accordance with claim 4 wherein said release means comprises a lug on said chassis frame disposed to engage each of said latches when said bed frame is parallel to said chassis frame for pivoting thereof to a position out of engagement with said ear.

6. A vehicle in accordance with claim 1 wherein retention means are provided to maintain said frame in a parallel relationship in said first position.

7. A vehicle in accordance with claim 6 wherein said retention means comprises:
means on one of said frames defining therewith a locking throat,
cam means on said one frame, and
follower means on the other of said frames for guiding and positioning said bed frame in said locking throat upon movement of the bed to said first position.

8. A tilting bed vehicle comprising:
a wheeled chassis frame,
a bed frame disposed on said chassis frame and movable between a first position of substantially coextensive and parallel adjacent relationship thereto and a second position rearwardly translated relative thereto,
means to move said bed frame between said first and second positions,
retention means on said frames for maintaining said frames in a parallel relationship in said first position, said retention means comprising means on one of said frames defining therewith a locking throat, cam means spaced rearwardly of said locking throat on one of said frames, and follower means on the other of said frames for engaging said cam and guiding and positioning said bed frame into said locking throat upon movement of the bed to said first position, and
extendable lever means pivotally connected between said frames, said lever means being extended when said bed frame is disposed in said first position and retracted and pivoted upwardly to raise one end of said bed frame when said bed frame is moved toward said second position.

9. In combination with a truck of the type having a chassis frame, a bed frame pivotally and slidably movable relative to the chassis frame and means for causing movement of said bed frame from and to horizontal position on the chassis frame, the improvement comprising:

means on said chassis frame defining a locking throat, said throat comprising an L-shaped plate, said plate having a first leg secured vertically to said chassis frame and a second leg overlying said chassis frame and defining a tapered slot therewith, cam means on said chassis frame comprising an arm extending vertically and rearwardly from said plate, a member on the upper end of said vertically extending arm for engaging and guiding the follower means thereby positioning said bed frame in said locking throat upon movement of the bed to the horizontal position.

10. The invention defined in claim 9 wherein said follower means is a roller carried adjacent the forward end of said bed frame, and said bed frame includes a laterally extending portion underlying said roller.

References Cited

UNITED STATES PATENTS

| | | | |
|---|---|---|---|
| 1,704,274 | 3/1929 | Anthony | 298—17.5 |
| 1,866,640 | 7/1932 | Fontaine | 214—146.5 |
| 2,901,287 | 8/1959 | Risley | 298—14 XR |
| 3,074,574 | 1/1963 | Prince | 214—505 |
| 3,107,020 | 10/1963 | Dempster et al. | 296—35.1 XR |

FOREIGN PATENTS 180,173   5/1922   Great Britain.

ALBERT J. MAKAY, *Primary Examiner.*

U.S. Cl. X.R.

214—146.5; 296—35.1; 298—14

UNITED STATES PATENT OFFICE
CERTIFICATE OF CORRECTION

Patent No. 3,450,282            Dated      June 17, 1969

Inventor(s) JAMES J. EZOLT

It is certified that error appears in the above-identified patent and that said Letters Patent are hereby corrected as shown below:

In the claims, Column 5, line 5, after "therewith," insert --follower means on said bed frame--; line 7, after "plate," insert --and--.

SIGNED AND SEALED

OCT 27 1970

(SEAL)
Attest:

Edward M. Fletcher, Jr.
Attesting Officer

WILLIAM E. SCHUYLER, JR.
Commissioner of Patents

FORM PO-1050 (10-69)